J. A. McCLURE.
BREATH DEFLECTOR.
APPLICATION FILED DEC. 1, 1911.

1,051,843.

Patented Jan. 28, 1913.

Witnesses
W. C. Smith
A. A. Olson

Inventor
Joseph A. McClure,
by Joshua R. H. Potts
his Attorney

UNITED STATES PATENT OFFICE.

JOSEPH A. McCLURE, OF BEMIDJI, MINNESOTA.

BREATH-DEFLECTOR.

1,051,843. Specification of Letters Patent. Patented Jan. 28, 1913.

Application filed December 1, 1911. Serial No. 663,412.

*To all whom it may concern:*

Be it known that I, JOSEPH A. MCCLURE, a citizen of the United States, residing at the city of Bemidji, county of Beltrami, and State of Minnesota, have invented certain new and useful Improvements in Breath-Deflectors, of which the following is a specification.

My invention relates to breath deflectors adapted for employment in conjunction with speculums for holding open the mouths of animals.

The object of my invention is the production of a deflector of the character mentioned adapted, when in operative position, to effect the deflection of the breath of an animal issuing from the nostrils so that the same will not be directed toward one administering medicine to the animal or otherwise treating the animal through the mouth.

A further object is the production of a deflector as mentioned which will be of simple and economical construction, one which may be attached to a speculum already in use, and one which will be of high efficiency in operation.

Other objects will appear hereinafter.

With these objects in view my invention consists in the combinations and arrangements of parts hereinafter described and claimed.

Figure 1:
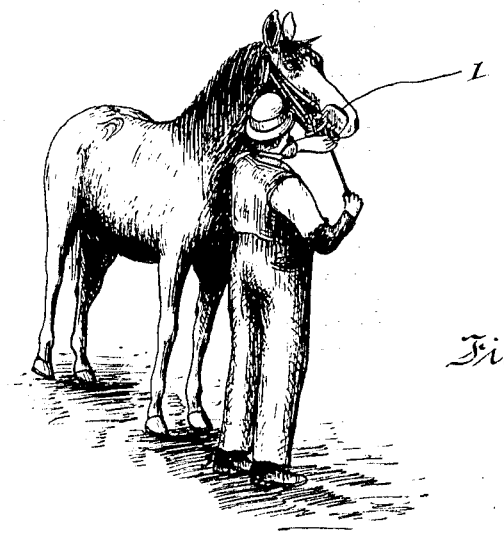
Figure 2:
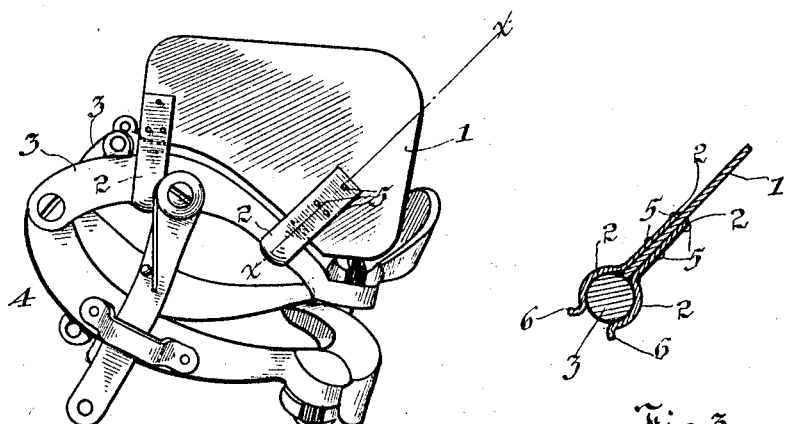
Figure 3:
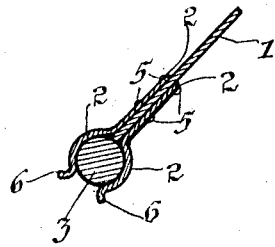

My invention will be best understood by reference to the accompanying drawing forming a part of this specification and in which, Figure 1 is a perspective view illustrating the manner of employment of a deflector embodying my invention, Fig. 2 is a perspective view of a speculum detached, to which is applied a deflector formed in accordance with my invention, and Fig. 3 is a detail section taken on line x—x of Fig. 2.

The preferred form of construction as illustrated in the drawing comprises a metallic plate 1 preferably of the peripheral form shown. At the lower edge of the plate 1 is provided two pairs of spring clips 2 which are adapted to embrace the uppermost pivoted side bars 3 of the speculum 4. The latter may be of any ordinary or preferred construction since the same forms no part of this invention, that shown in the drawing being of conventional construction. The spring clips 2 are secured to the plate 1 preferably by means of rivets 5, the lower engaging ends of said clips being preferably flared or diverged as at 6 to facilitate engagement thereof with the side bars 3 of the speculum. When the plate 1 is arranged upon the bar 3 of the speculum as shown, the former will be positioned directly in front of one of the nostrils of the animal so that the breath issuing therefrom will be deflected and so that the same will not be directed toward one administering to the animal as shown in Fig. 1 of the drawing.

The device may be readily and easily attached or detached and may be arranged at either side of the speculum for deflecting the breath from either nostril.

The device is extremely simple in construction, hence may be manufactured at a low cost.

This device will be found of great convenience and comfort to veterinary doctors or others administering to animals, the blowing of the breath upon one attending an animal, being, at the present time, of great discomfort and inconvenience. The present device is adapted to obviate this disagreeable feature in the administration to animals, and with very little expense to the purchaser thereof.

While I have illustrated and described the preferred construction for carrying my invention into effect this is capable of variation and modification without departing from the spirit of the invention. I, therefore, do not wish to be limited to the exact details of construction as set forth but desire to avail myself of such variations and modifications as come within the scope of the pending claims.

Having described my invention what I claim as new and desire to secure by Letters Patent is:

1. The combination with a speculum for holding open the mouth of an animal, of a plate on said speculum for deflecting the breath of the animal issuing from the nostrils, substantially as described.

2. The combination with a speculum for holding open the mouth of an animal, of means detachably secured on said speculum for deflecting the breath of the animal issuing from the nostrils, substantially as described.

3. The combination with a speculum for holding open the mouth of an animal, of a plate detachably secured on said speculum for deflecting the breath of the animal issuing from the nostrils, substantially as described.

4. The combination with a speculum for holding open the mouth of an animal, of means for deflecting the breath of the animal issuing from the nostrils; and resilient engaging means for detachably securing said deflecting means to said speculum, substantially as described.

5. The combination with a speculum for holding open the mouth of an animal, of a plate for deflecting the breath of the animal issuing from the nostrils; and resilient means on said plate releasably engaging said speculum for supporting said plate in operative position, substantially as described.

6. The combination with a speculum for holding open the mouth of an animal, of a plate for deflecting the breath of the animal issuing from the nostrils; and spring clips on said plate releasably engaging said speculum for supporting said plate in operative position directly in front of one of the nostrils of the animal, substantially as described.

7. In a breath deflector for animals, the combination of means adapted for arrangement at the side of the head of an animal adjacent one nostril for deflecting the breath issuing from said nostril; and means for supporting said deflecting means in operative position, substantially as described.

8. In a breath deflector for animals, the combination of a plate adapted for arrangement at the side of the head of an animal adjacent one nostril for deflecting the breath issuing from said nostril; and means for supporting said plate in operative position, substantially as described.

9. In a breath deflector for animals, the combination of a plate adapted for arrangement at the side of the head of an animal adjacent one nostril for deflecting forwardly the breath issuing from said nostril; and means for supporting said plate in operative position, substantially as described.

10. In a breath deflector for animals, the combination of means adapted for arrangement at the side of the head of an animal adjacent one nostril for deflecting the breath issuing from said nostril; and means engaging the lower end portion of said deflecting means for supporting the same in operative position, substantially as described.

In testimony whereof I have signed my name to this specification in the presence of two subscribing witnesses.

JOSEPH A. McCLURE.

Witnesses:
C. J. WOODMANSEE,
ALBERT RHODA, Jr.

---

Copies of this patent may be obtained for five cents each, by addressing the "Commissioner of Patents, Washington, D. C."